Aug. 23, 1927.　　　　　H. KRAUSE　　　　　1,640,041
MACHINE FOR GATHERING TURNIPS
Filed Dec. 24, 1925
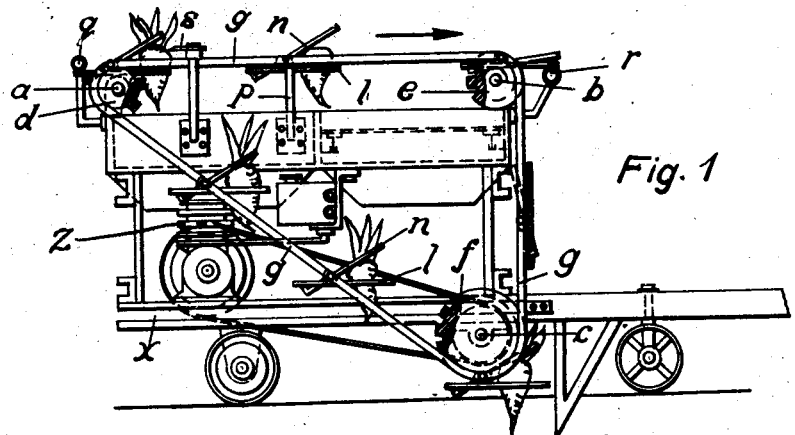
Fig. 1
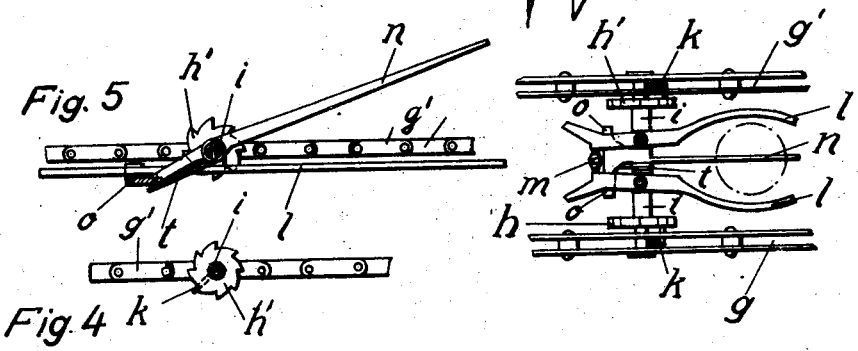
Fig. 5　　　　　Fig. 3
Fig. 4
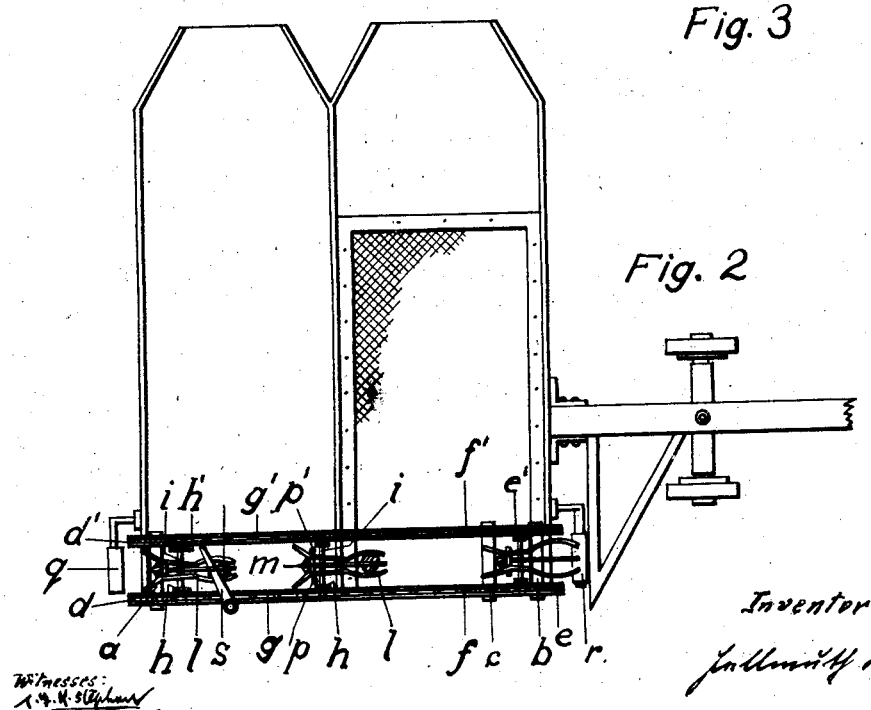
Fig. 2
Inventor:

Patented Aug. 23, 1927.

1,640,041

UNITED STATES PATENT OFFICE.

HELLMUTH KRAUSE, OF SCHKEITBAR NEAR SCHKOLEN, GERMANY, ASSIGNOR OF ONE-HALF TO EDWIN KRAUSE, OF SCHKEITBAR NEAR SCHKOLEN, GERMANY.

MACHINE FOR GATHERING TURNIPS.

Application filed December 24, 1926, Serial No. 156,945, and in Germany November 18, 1926.

This invention relates to an improved machine for gathering turnips, and the novelty consists in the fact that a motor mounted on the truck of the machine sets a plurality of horizontal shafts forming the corners of a triangle in rapid rotation by means of a chain gearing comprising two parallel endless chains between which grippers are arranged for lifting the turnips from the ground and leading them to a collector provided for this purpose.

The accompanying drawing illustrates the improved machine: Figs. 1 and 2 are respectively a side view and a plan view of the same, while Figs. 3, 4 and 5 show details thereof on a larger scale, respectively in a plan view and two different side views partly in section.

The machine comprises a truck to be drawn by animals, with the conventional lifter for loosening and raising the turnips somewhat from the ground. The upper framing $x$ of said truck carries a motor $z$, which by suitable gears serves for driving three horizontal shafts $a$, $b$, $c$ forming the corners of a triangle. Each shaft carries two chain-wheels $d$, $d'$, $e$, $e'$, $f$, $f'$, of which the two latter wheels are larger than the other wheels and resiliently mounted. Over said chain-wheels two parallel endless chains $g$, $g'$ are led in clockwise direction, which contain each, in uniform distribution thereon, a plurality of ratchet-wheels $h$, $h'$ in which spacing axles $i$ are revolubly mounted and arrested by spring-pawls $k$ on the ends of said axles in gear with said ratchet-wheels. Each axle $i$ carries a tong-like gripper $l$, of which the short rear members are acted upon by a pressure-spring $m$, and a turning-lever $n$ between the tong members, of which the short rear arm is weakly spring-influenced by means of a spring $t$ (Figs. 3 and 5) and fitted with a cross-member $o$ embracing with its bent ends the outer faces of the short rear members of the tongs and holding the latter in this position with the pressure-spring $m$ tensioned. The tensioning of the spring $m$ is effected by two vertical bolts $p$, $p'$ facing one another and arranged at such a distance between the chains at the upper horizontal side of the triangle mentioned that they close the two short tong members on the moving chains while at the same time by tilting of the turning-lever $n$ the rear cross-member $o$ of the latter embraces said short tong members. Between the two chains and at the ends of the upper horizontal side of the triangle mentioned, further, rollers $q$ and $r$ are located, which serve as abutments, the latter for the long arm of the turning-lever $n$ and the former for the short arm of the same and which act to turn the axles $i$ each time so far that the tongs assume the required position, in which they are held by the spring-pawls $k$. Furthermore, between said chains and at the upper horizontal side of the triangle mentioned, a cutter $s$ is arranged which cuts the tops of the turnips passing along the same.

The frame $x$ carries further a shaking screen operated by the motor $z$, and two collectors, one for the turnips and the other for the cut turnip tops, which can be opened and discharged upon adjustable chutes, all this being already known in the art and not forming part of the present invention.

The operation of the improved machine is as follows:—The chain gearing leads each gripper to a loosened turnip, the lever $n$ bearing then upon the top of the latter and being pressed upwards about its fulcrum. Thereby, the short lever arm $o$ is turned downwards and frees the tensioned spring $m$ whereby the tongs $l$ are allowed to grip the turnip. The latter is then moved upwards along the inclined side of the triangle mentioned, at the top of which the short lever arm $o$ strikes against the roller $q$, which brings the tongs $l$ into horizontal position while turning the same on the axle $i$ and operating the pawls $k$. Then, the turnip passes along the cutter $s$ which cuts the top thereof, the latter falling into the collector above-mentioned. At the same moment, the gripper $l$ passes between the two vertical bolts, $p$, $p'$, which are so distanced from one another that they do not form an impediment for a free passage of the turnip therethrough, while they cause the tongs $l$ to close at their short rear ends whereby the turnip is freed from the gripper and falls into the other collector above-mentioned. During the compression of the short tong members and tensioning of the spring $m$ the free lever $n$ is turned so that its short rear arm $o$ embraces again the rear tong members and keeps the spring $m$ in tensioned position. During the further advance of the chain gearing, the long arm of the lever $n$ is, then, at the end of the horizontal side of the triangle mentioned, brought in contact with the roller $r$, which turns the axle $i$ with a free slipping of the pawls $k$ on their ratchet-wheels until the gripper $l$ assumes the required fresh position for its descent along the vertical side of the triangle mentioned, in which position it is held by the pawls $k$ and passed to another turnip for a further operation in the way described.

What I claim, is:—

1. The combination, in a machine for gathering turnips, with a truck, a motor mounted on the latter, three horizontal shafts revolubly arranged on said truck and forming the corners of a triangle, a chain gearing for driving said shafts from said motor and comprising two parallel endless chains, and tonglike grippers having short rear arms and long gripping members arranged between said chains and adapted to lift the turnips from the ground, of spacing axles between said chains on which said grippers are mounted, ratchet-wheels on said chains in which said axles are revolubly mounted, and spring-pawls on the ends of said axles in gear with said ratchet-wheels.

2. In a machine as specified in claim 1, a pressure-spring arranged between the short rear arms of each gripper, and a turning-lever having a long arm extending between the long gripping members of said grippers and a weakly spring-influenced short arm adapted to embrace the short rear arms of said grippers and to keep said spring tensioned.

3. In a machine as specified in claim 1, a pressure-spring arranged between the short rear arms of each gripper, a turning-lever having a long arm extending between the long gripping members of said grippers and a weakly spring-influenced short arm adapted to embrace the short rear arms of said grippers and to keep said spring tensioned, and stationary means located adjacent the turnip collector for operating the grippers to release the turnip.

In testimony whereof I have hereunto set my hand.

HELLMUTH KRAUSE.